United States Patent
Hattan

[11] 3,938,209
[45] Feb. 17, 1976

[54] FORMATION OF FASTENERS HAVING THREADS FORMED OF COIL STRUCTURES

[75] Inventor: Mark Hattan, Newport Beach, Calif.

[73] Assignee: William P. Green, Pasadena, Calif.; a part interest

[22] Filed: Nov. 22, 1974

[21] Appl. No.: 526,230

Related U.S. Application Data

[63] Continuation of Ser. No. 338,290, March 5, 1973, abandoned, which is a continuation-in-part of Ser. Nos. 229,996, Feb. 28, 1972, abandoned, and Ser. No. 121,817, March 8, 1971, abandoned.

[52] U.S. Cl. .............................. 10/86 A; 151/14 CS
[51] Int. Cl.² ......................................... B21D 53/24
[58] Field of Search ............ 10/86 R, 86 A; 85/9 W, 85/32 CS; 151/14 CS, 21

[56] References Cited
UNITED STATES PATENTS

| | | | |
|---|---|---|---|
| 2,262,450 | 11/1941 | Caminez | 85/32 CS |
| 2,387,257 | 10/1945 | Haas | 151/14 CS |
| 2,407,879 | 9/1946 | Haas | 85/32 CS |
| 2,480,966 | 9/1949 | Richardson et al. | 10/86 R |
| 2,497,081 | 2/1950 | Hattan | 10/86 A |
| 2,688,355 | 9/1954 | Forster | 10/86 A |
| 2,775,992 | 1/1957 | Smith | 151/14 CS |
| 2,784,428 | 3/1957 | Curran | 10/86 A |
| 3,039,507 | 6/1962 | Hattan | 151/14 CS |
| 3,283,350 | 11/1966 | Hattan | 10/86 A |
| 3,611,862 | 10/1971 | Walker | 10/27 R |

*Primary Examiner*—C. W. Lanham
*Assistant Examiner*—E. M. Combs
*Attorney, Agent, or Firm*—William P. Green

[57] ABSTRACT

The method of manufacturing a threaded nut having a case containing a separately formed essentially helical coil structure which forms an internal thread and is fusion bonded to the case, preferably by electron beam welding. The coil structure desirably has a locking portion which is substantially free of direct attachment to the adjacent portion of the case, with this locking portion and the surrounding portion of the case both being deformed to a condition requiring radially outward displacement thereof upon threaded engagement with a mating screw, to thereby attain a very effective self-locking action preventing unscrewing of the nut.

16 Claims, 15 Drawing Figures

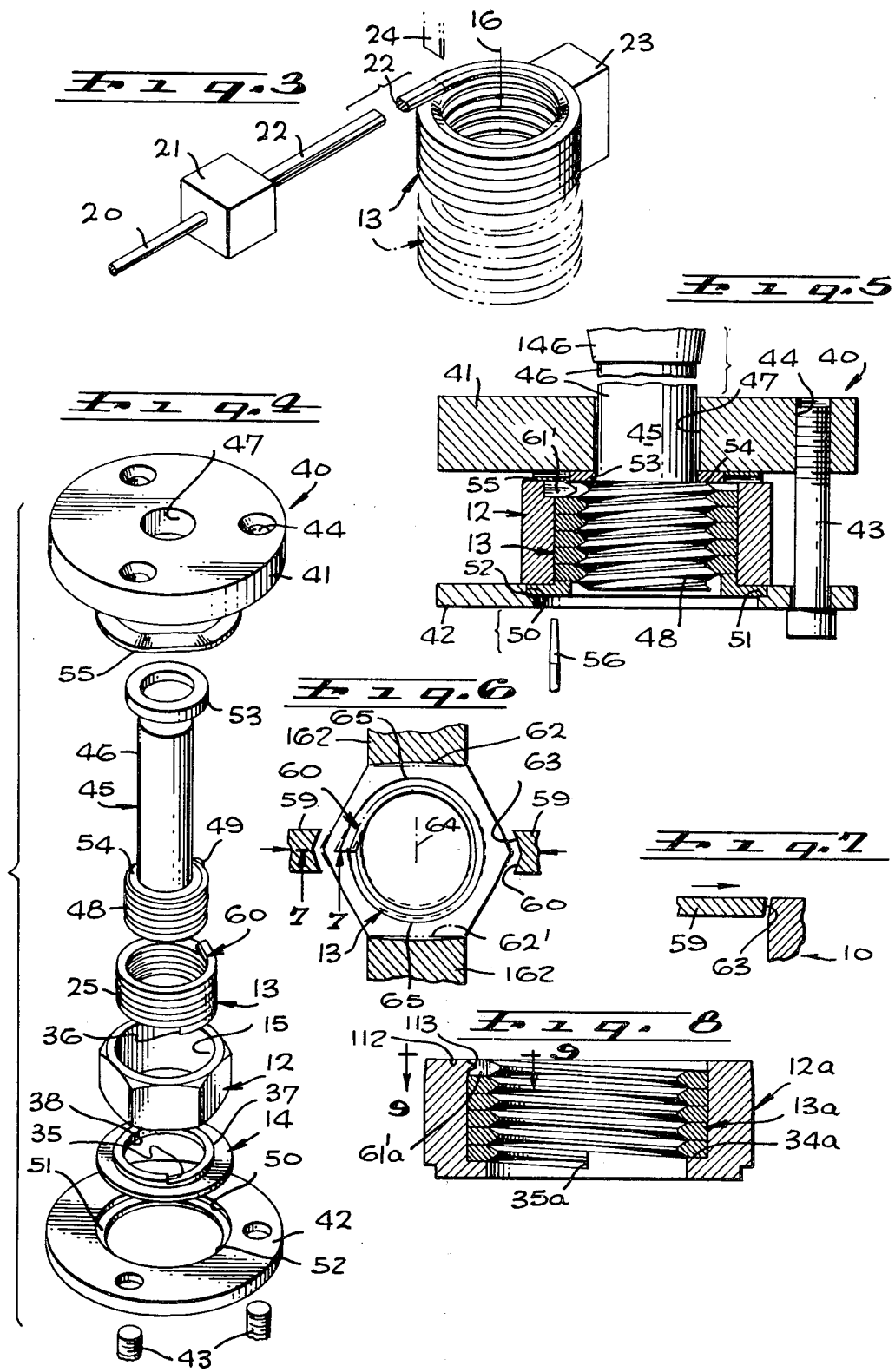

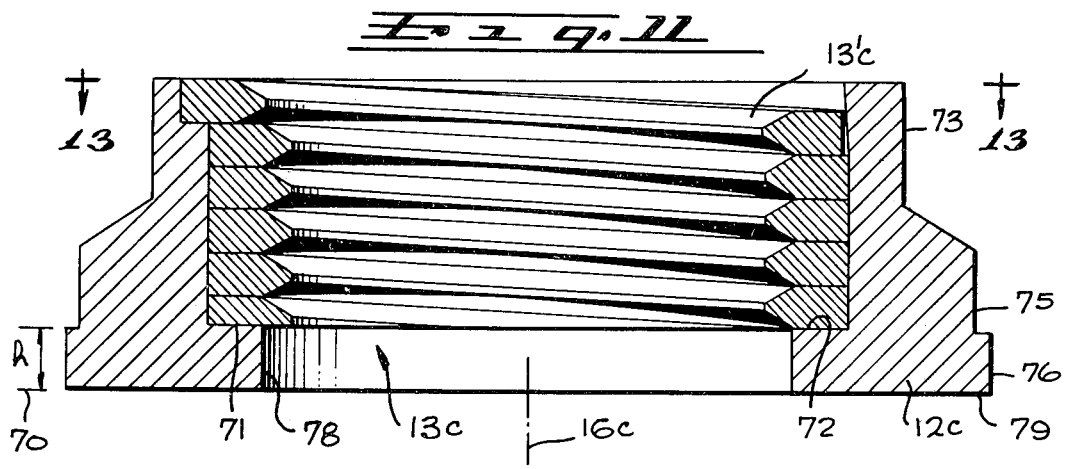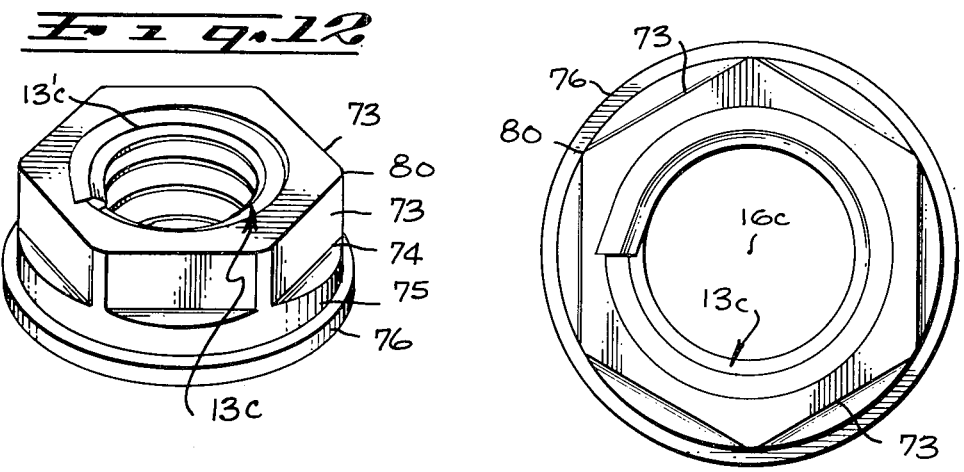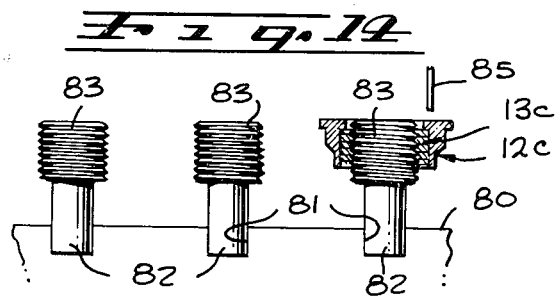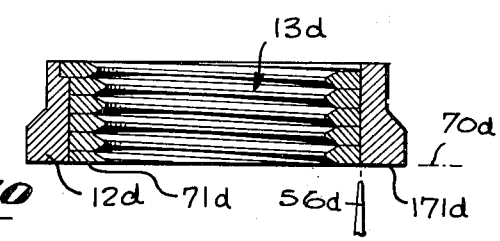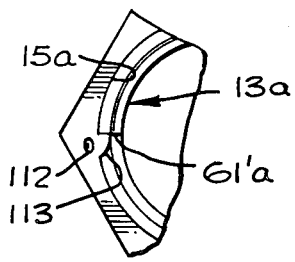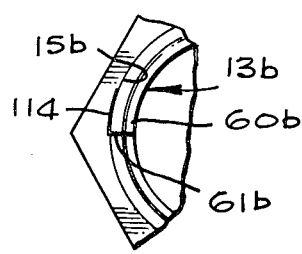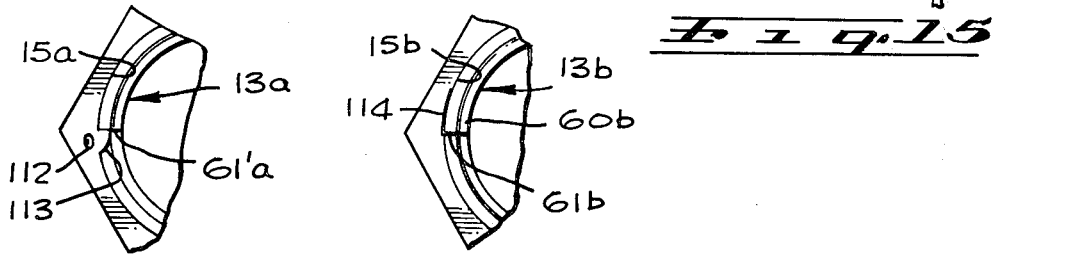

3,938,209

FORMATION OF FASTENERS HAVING THREADS FORMED OF COIL STRUCTURES

CROSS REFERENCE TO RELATED APPLICATIONS

This application is a continuation of my copending application Ser. No. 338,290 filed Mar. 5, 1973, now abandoned, which was a continuation-in-part of my copending applications Ser. No. 121,817 filed Mar. 8, 1971, now abandoned and Ser. No. 229,996 filed Feb. 28, 1972, now abandoned.

BACKGROUND OF THE INVENTION

This invention relates to improved methods and apparatus for manufacturing threaded nuts of a type utilizing a wiredrawn helical coil structure for forming a thread.

In my prior U.S. Pat. Nos. 3,272,250 and 3,283,350, and in certain other prior patents, I have disclosed a type of nut in which the thread proper is formed separately from and is contained within an outer case or body structure of the nut. More particularly, the thread is formed as an essentially helical resilient coil structure, desirably made from a wire drawn to a proper cross sectional configuration to present at its radially inner side a suitable thread profile for engaging a coacting screw. Preferably, at least a portion of the coil structure is rigidly bonded to the outer case to form an integrated assembly having adequate strength to properly withstand all of the forces which may be encountered in use. Such a nut may be given a self-locking action by deforming a portion of the coil structure to a condition in which it has an interference fit with the coacting screw, and must be forced by the screw to a changed condition upon threaded interengagement of the two parts.

SUMMARY OF THE INVENTION

The present invention relates to improvements in the manufacture of nuts of the above discussed type, for increasing their strength and load carrying capacity, vastly improving the self-locking action which may be attained in such a nut, and by virtue of these factors enabling employment of nuts of much smaller size and lower weight for a particular use than has heretofore been possible. With regard to the increase in strength of the nut, this is attained largely by a unique manufacturing process by which a fusion bond is formed between the outer case and coil structure without substantially reducing the strength of the nut by the heat of fusion bonding. For this purpose, the coil structure is first cold worked to a proper thread shaped and work hardened condition, and is then fusion bonded to the outer case in a manner avoiding destruction of its work hardened condition. More specifically, during the bonding process only the radially outer portion of the coil structure is heated, to form a bond to the case, while the radially inner portion of the coil structure which forms the actual thread profile is maintained at a lower temperature not high enough to destroy its cold worked condition.

Preferably, this localized heating of only the radially outer portion of the coil structure is attained by use of a high energy heating beam, such as an electron beam or laser beam, which is so aimed and controlled as to avoid excessive heating of the radially inner portion of the coil structure. In the optimum arrangement, the beam is directed axially along the periphery of the coil structure, to form an effective and preferably essentially annular weld between the outer edge of the coil structure and the radially inner surface of the case. This beam may also at the same time be so aimed as to bond directly together the radially outer portions of successive turns of the coil structure, so that the coils and case are very positively and permanently integrated for use together as a high strength rigid nut. At one end of the coil structure, the case may carry or form a shoulder against which the end turn of the coil structure may bear in load transmitting relation. The welding beam may be directed through this end shoulder and to the location between the periphery of the coil structure and the inner wall of the case. In one arrangement, the shoulder is formed on a separate end plate, which may itself be welded or otherwise secured to the case, while in another form of the invention the end shoulder is formed integrally with the outer case.

Certain additional features of the invention relate to a preferred way of attaining an optimum self-locking action in a nut of the above discussed general type. To maximize the self-locking effect, the coil structure and case may be so constructed as to require forced deformation of both the locking portion of the coil structure and the surrounding portion of the outer case when the nut is connected to an associated screw. The outer case may be essentially rigid but at the same time very slightly resiliently deformable, so that the great strength of the case is added to the resilience of the coil structure itself in resisting deformation of the coil structure and maximizing the self-locking action attainable from a very small portion of the coil structure, preferably a single turn thereof. Also, because the forces exerted against the locking portion of the coil structure are in this way transmitted directly to the outer case of the device, this locking portion of the coil structure can function as an axial load bearing portion of the nut, rather than, as in most conventional lock nuts, serving only the self-locking purpose, to thus minimize the number of turns required for sustaining a particular axial load.

The self-locking configuration of the coil structure and outer case may be produced by locally deforming radially inwardly a portion of the case and contained coil structure after they have been assembled together. For best results, the case and an end turn of the coil structure are deformed radially inwardly at two diametrically opposite locations, to assume a slightly oval rather than precisely circular shape. After such deformation, the entire unit may be heat treated to harden both the case and contained coil structure in such deformed condition.

Additional features of the invention relate to a preferred method and apparatus for holding the coil structure, case, and end plate if used, in tightly assembled relation during the welding operation which secures these parts together.

BRIEF DESCRIPTION OF THE DRAWINGS

The above and other features and objects of the invention will be better understood from the following detailed description of the typical embodiments illustrated in the accompanying drawings in which:

FIG. 3 is a diagrammatic representation of the manner of formation of the inner coil structure of the device;

FIG. 4 is an exploded perspective view of a clamping tool for holding the parts of the device in assembled relation during an electron beam welding operation;

FIG. 5 shows the tool of FIG. 4 during the actual welding step;

FIG. 6 is a plan view corresponding to FIG. 2, and representing the manner in which an axially outer portion of the nut is deformed to self-locking configuration;

FIG. 7 is a section taken on line 7—7 of FIG. 6;

FIG. 8 is a view similar to FIG. 1, but showing a variational form of nut formed in accordance with the invention;

FIG. 9 is a section on line 9—9 of FIG. 8;

FIG. 10 is a view similar to FIG. 9 but showing another form of nut embodying the invention;

FIG. 11 is an axial section similar to FIG. 1 but showing another variational nut formed in accordance with the invention;

FIG. 12 is a perspective view of the FIG. 11 unit;

FIG. 13 is a plan view taken on line 13—13 of FIG. 11;

FIG. 14 illustrates a welding process which may be utilized in forming lock nuts according to the invention; and FIG. 15 is a sectional view similar to FIG. 11 of another variational nut formed in accordance with the invention.

DESCRIPTION OF THE PREFERRED EMBODIMENTS

Figure 1:
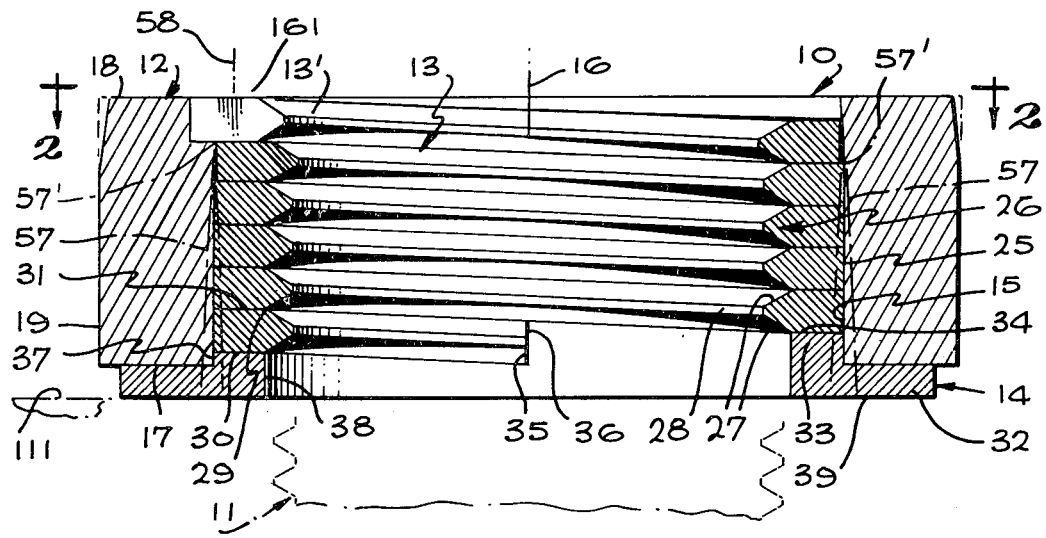
FIG. 1 is an axial section through a lock nut constructed in accordance with the invention.

Referring first to FIG. 1, I have shown at 10 a lock nut constructed in accordance with the invention and which is adapted to be connected onto a screw represented fragmentarily at 11. In use, the lower end of the nut 10 is its axially inner end, and is adapted to be tightened against a work piece 111, to take the axial load forces from the work piece.

The nut includes an outer generally annular case 12 containing an essentially helical coil structure 13 forming the thread for engagement with screw 11. In the preferred arrangement as shown in the figures, coil structure 13 is a single continuous helical element, though it is contemplated that in some instances devices utilizing some of the features of the invention may employ a coil structure formed of a series of separate thread elements. At its axially inner side, the nut has an end plate 14 which transmits the axial load forces to the work piece.

The outer case 12 of the nut has a radially inner surface 15 which as initially formed is a straight cylindrical surface centered about axis 16 of the nut. At opposite ends of this cylindrical surface 15, the case or body 12 has two transverse end faces 17 and 18 which are directly perpendicular to axis 16. The radially outer surface 19 of case 12 is shaped for engagement by a wrench or other tool, and preferably has the hexagonal transverse sectional configuration illustrated in FIG. 2. The case is formed of a metal to which the inner coil structure 13 can be fusion bonded, and which is rigid and very strong in order to effectively take a large portion of the expansive hoop stress exerted radially outwardly against the nut by the screw when the two are tightened together. The metal of the case is very slightly deformable upon imposition of localized radially outward forces against its side wall, and in the completed nut is resilient to strongly resist such deformation and return by its own resilience to a predetermined normal condition after release of the distorting forces. For very high quality aircraft type nuts, the case may be formed of stainless steel or titanium, and be ultimately heat treated to give it the proper hardness, strength and resilience. A martensitic stainless steel is ideal for the purpose, such as 17-4PH stainless, which is a martensitic copper bearing material adapted to be heat treated to a hardened condition by elevation to a temperature of 900° Fahrenheit for one hour followed by slow air cooling (no quenching). Such heat treating does not distort the case, and is not at a temperature high enough to adversely affect the cold worked 'C' condition of the contained coil structure 13.

FIG. 3 shows diagrammatically the manner in which coil structure 13 may be formed from a metal wire 20, which may initially be of conventional circular cross section. This wire will normally be cold worked to some extent by the initial wire drawing of the wire to that circular cross sectional shape, and is then further work hardened by shaping it to the form of a thread. As represented in FIG. 3, the circular wire 20 may be pulled or otherwise forced through a forming machine 21, containing appropriate dies for exerting forces transversely against the wire in a manner giving to the wire at the exit side of unit 21 a thread shaped cross section, as indicated at 22 in FIG. 3. The wire is then forced against a forming die 23 or other unit shaped to deflect the wire along a helical coiling path, to form the wire into a coil as illustrated in FIG. 1. Successive coils may typically have 5¼ turns, as shown, and may be cut off by an appropriate cutter as represented at 24 in FIG. 3. The cold working operation of FIG. 3 is of course performed before heat treatment of the wire, and while the wire is adapted to be relatively easily deformed.

With reference again to FIG. 1, the cross section which is given to the wire by the forming apparatus of FIG. 3 forms (except at the upper extremity 60 of the coil—see FIG. 2) a radially outer cylindrical surface 25 of the coil centered about axis 16 and having a diameter corresponding to the diameter of internal surface 15 of case 12. At its radially inner side, the cross section of the thread forms a thread profile at 26, having two converging surfaces 27 defined opposite side faces of the thread, and having a flat 28 at the inner extremity of the thread. From the location 29 radially outwardly to the diameter of outer surface 25, each turn of the coil element 13 has axially inner and outer opposite side surfaces 30 and 31, which are preferably parallel to one another and extend directly radially outwardly. The structure 13 is coiled or wound tightly so that these surfaces 30 and 31 on successive turns of the coil are in direct abutting contact with one another.

Figure 2:
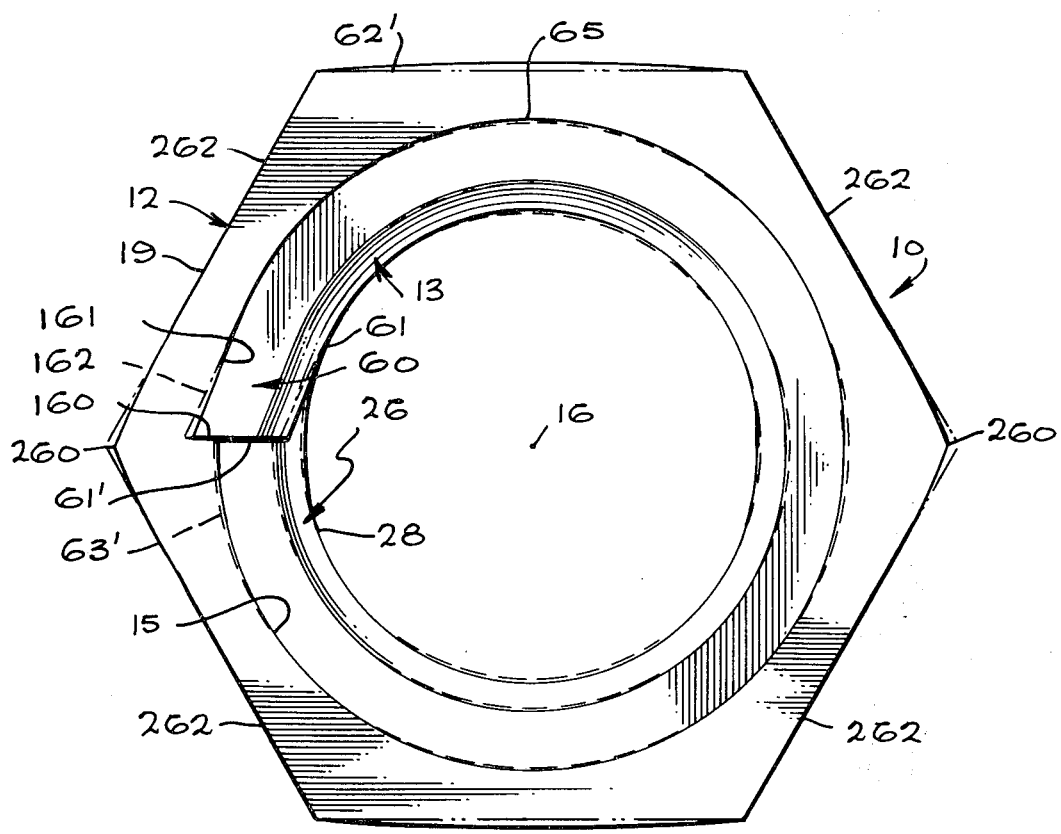
FIG. 2 is a plan view taken on line 2—2 of FIG. 1.

The upper extremity 60 of the coil has essentially the same cross section as the rest of the coil except that the extremity 60 is deformed slightly radially outwardly with respect to axis 16, desirably extending tangentially rather than circularly from the location 61 of FIG. 2 to end surface 61' which may extend directly radially with respect to the axis. A recess or notch 161 formed in case 12 at the location of coil extremity 60 extends radially outwardly beyond the diameter of surface 15 and downwardly beneath the plane of upper surface 18 and is shaped tangentially to receive and conform to the extremity 60 of the coil and provide a shoulder 160 against which end face 61' abuts circularly.

Coil structure 13 may be formed of a suitable metal such as steel having sufficient strength to take the various forces imposed on the coil in use, and preferably being resilient and slightly deformable in the final condition of the metal of this coil. The material of the coil should be of a character adapted to be hardened by cold working, and to then be further hardened by heat treating but at a temperature which is not high enough to destroy the cold worked condition. Thus, the coil may ultimately be in the 'CH' condition, hardened by both cold working and heat treatment. The coil is of a character adapted to be fusion bonded at its radially outer side to case 12, preferably by electron beam welding. A metal which is found highly effective for the purpose is 17-7PH stainless steel, which is semi-austenitic until cold worked to condition C, but which is rendered martensitic by 60% or more cold working (as occurs during the shaping and coiling process of FIG. 3). The same heat treatment previously described for the martensitic case may then be employed for simultaneously hardening the coil by heat treatment.

Base plate 14, which may be formed of the same material as outer case 12, has an annular radially extending flange 32, which is received against the under or axially inner surface 17 of the case, and transmits forces thereto. The radially inner portion of end plate 14 projects upwardly or axially outwardly into the lower portion of the case at 33, to form a preferably helical one turn ramp or shoulder surface 34 against which the undersurface 30 of the lowermost turn of coil structure 13 bears downwardly or axially inwardly. At the opposite ends of the single turn of ramp surface 34, plate 14 has an axially extending shoulder 35 against which the end surface 36 of the lowermost turn of coil 13 abuts circularly, to transmit rotary load forces between the coil and the end plate. At its radially outer side, the portion 33 of end plate 14 has a cylindrical surface 37 which is a tight fit within internal cylindrical surface 15 of the case, while at its radiaaly inner side the flange forms a cylindrical surface 38 of a diameter at least as great as the major diameter of the internal thread formed at 26. The undersurface 39 of end plate 14 should be flat and disposed directly transversely of axis 16 through its entire radial extent between the diameter of surface 38 and the periphery of plate 14, to properly contact a work piece, and also to avoid deflection of the later-to-be-discussed welding beam by any irregularities on surface 39. The radially inner surface of plate 14 may if desired be shaped to itself form an additional turn of thread, as a continuation of thread surfaces 27 and 28, but this feature is not shown in the drawing.

FIGS. 4 and 5 show in exploded and assembled conditions respectively a tool 40 which may be employed for holding the three parts 12, 13, and 14 together in assembled relation during an electron beam welding operation. This tool includes upper and lower transverse clamping plates 41 and 42, which are adapted to be clamped axially together by appropriate means typically represented as a series of evenly circularly spaced screws 43 extending through apertures in the lower plate 42 and connecting into threaded openings 44 in the upper plate. A mandrel 45 of highly heat conductive material has an upper reduced diameter shaft portion 46 adapted to extend through and be closely confined within a correspondingly dimensioned opening 47 formed in top plate 41 of the tool. At its lower end, mandrel 45 has an enlarged diameter externally threaded portion 48, dimensioned in correspondence with the thread on screw 11 which is to ultimately mate with the nut 10. The coil structure 13 formed in the equipment of FIG. 3 is screwed onto the outer threaded surface of portion 48 of the mandrel, with the advancement of the coil onto the mandrel being limited by engagement of the upper end of the coil with a stop shoulder formed at 49 at the top of the mandrel thread. When screwed onto the mandrel, coil 13 is in its cold worked and non-heat-treated condition, with the entire coil of precisely uniform diameter through its entire axial length except at the location of the slightly outwardly turned extremity 60.

The coil 13 thus carried on mandrel 45 is inserted into bore 15 of case 12, with that case in its non-heat-treated condition, and with bore 15 in a precisely straight cylindrical condition to closely receive and engage the outer surface 25 of the coil. End plate 14 is placed in the lower end of the case as shown in FIGS. 1 and 5, and the mandrel and end plate are then turned to bring the upper end surface 61' of the coil into abutting engagement with shoulder 160 on the case and to then bring shoulder 35 of plate 14 into engagement with the lower end 36 of the coil. The circular peripheral portion of plate 14 fits within a shallow recess 50 formed in the bottom clamping plate 42, and abuts downwardly against a narrow annular shoulder 51 in that bottom clamping plate, to be tightened upwardly by plate 42. The plate 42 contains a relatively large opening defined by an edge 52, of a diameter substantially greater than the diameter of bore 15 in case 12, so that plate 42 does not interfere with the aiming of an electron beam upwardly through plate 14 at the diameter of bore 15.

The three parts 12, 13 and 14 are clamped together by plates 41 and 42 in the conditon illustrated in FIG. 5, in which an annular spacer washer 53 is clamped tightly between top plate 41 and an upwardly facing annular shoulder 54 formed on mandrel 45, to clamp the mandrel tightly downwardly toward bottom plate 42, and in this way hold the lowermost turn of coil 13 tightly against base plate 14. Radially outwardly of the washer 53, there is provided a generally annular washer type spring 55, which transmits yielding force from upper clamping plate 41 to the upper surface 18 of nut case 12, to simultaneously urge that case 12 downwardly and tightly against the radially outer portion of end plate 14 of the nut. Thus, the tool 40 of FIGS. 4 and 5 holds both the coil 13 and case 12 tightly against end plate 14 to assure formation of an optimum weld, and to prevent unwanted spatter of the welding material. As will be apparent, other types of equipment may be provided for thus clamping the parts together, or this clamping process may be effected primarily manually.

The threaded portion of the mandrel holds the coil 13 very precisely in a proper orientation and position during the subsequent welding operation, acts to prevent movement of any weld spatter from one side of the nut to the other during the welding operation, and in addition functions as a highly heat conductive heat sink acting to conduct the welding heat rapidly away from the thread area. Preferably, the mandrel is formed of an appropriate metal, desirably having a heat conductivity greater than that of the coil itself. Copper, aluminum or a suitable steel are satisfactory for the purpose. The mandrel preferably terminates in essentially the transverse plane in which elements 12 and 14 join, so that cross-spatter will adhere to the end face of the mandrel and not to its threads, thus permitting removal after welding.

With the parts of the device clamped together in the condition illustrated in FIG. 5, a high energy beam, preferably an electron beam, is directed from an electron gun 56 axially along the inner surface of bore 15 in the case, and therefore along the outer surface 25 of coil 13, to locally heat the radially inner portion of the case and the radially outer portion of the coil to welding temperature, and thereby weld the coil rigidly to the case. The beam is directed upwardly parallel to axis 16 and first through plate 14 in order to arrive at the desired location between the case and coil. This beam has a narrow upwardly tapering conical shape, as indicated at 57 in FIG. 1, and continues vertically or axially far enough to weld a predetermined first series of turns of coil 13 (preferably the bottom four and one-fourth turns) to the case, while leaving a predetermined uppermost portion of the coil (preferably an uppermost single 360° turn 13') substantially unwelded to the case. Thus, the electron beam terminates at the location 57' in FIG. 1. The electron beam is sufficiently wide radially with respect to axis 16 to extend radially inwardly a short distance beyond the diameter of bore 15 of the case, and thus to weld the radially outermost portions of the surfaces 30 and 31 of each turn of the coil 13 to the abutting surfaces 30 and 31 of the adjacent turn, through the first four and one-fourth turns of the coil, so that those first four and one-fourth turns are welded directly together as well as to the case. The beam preferably does not weld the top turn to the next successive turn or to the case. The electron beam does of course weld base plate 14 to case 12 and to the radially outer portion of undersurface 30 of the lowermost turn of coil 13. During the welding operation, the nut is turned about its axis 16 relative to electron gun 56, as by means of a rotary chuck 146 gripping shank 46 of mandrel 45 (or conversely the nut may be held stationary and the beam be rotated), so that the electron beam forms a circularly continuous weld between the discussed portions of the case and coil, and between adjacent ones of the bottom 4 ¼ turns of the coil, and between the end plate 14 and both the case and coil. As the nut is turned, the intensity of the electron beam may be gradually and progressively varied, so that the uppermost point 57' of the beam and weld area advances helically in correspondence with the advancement of the upper edge of the last turn which is to be welded, to attain the desired result of welding in place the lowermost four and one-fourth turns without welding the upper turn.

The electron beam energy is sufficiently localized to raise the temperature of the radially outer portion of coil structure 13 to welding temperature, say for example to about 2750 degrees Fahrenheit or above, while avoiding elevation of the temperature of the radially inner thread profile portion 26 of the coil (preferably at least about the inner one-half of the coil 13, inwardly beyond the line designated 58 in FIG. 1) high enough to adversely affect or destroy the cold worked condition (condition C) of the coil metal. When the metal of coil 13 is 17-7PH stainless steel, as discussed, the radially inner thread profile portion 26 of coil 13, and preferably at least about the inner one-half of the radial extent of the coil 13, should be kept well under the normal annealing temperature of 1750° Fahrenheit (preferably under 950° Fahrenheit) during the fusion bonding process. The heat sink effect of mandrel 48 in rapidly conducting heat away from the inner portion of the coil assists in maintaining its desired low temperature.

With the welding operation completed, the welded nut is removed from tool 40 of FIGS. 4 and 5, and the upper unwelded portion of the nut is then slightly deformed in a manner giving the case and upper turn of the coil 13 a self-locking configuration. This deformation may be effected by positioning the upper portion of the nut body between two forging dies 59 as seen in FIG. 6, and then pressing those dies together far enough to deform two diametrically opposite portions of the case slightly radially inwardly. The dies 59 preferably deform the case inwardly at the locations of two of the points 260 of the externally hexagonal outer surface of the nut case. The upper end surface 61' of the coil may be located directly radially opposite one of these points which is deformed. The notches 63 in the two dies 59 are shaped to correspond substantially to the 120° corner configuration of the hexagonal shape, and as seen in FIG. 7, the walls of these notches may flare slightly outwardly with respect to axis 16 as they advance downwardly, to enable deformation of only the upper portion of the case in the manner indicated in FIG. 1. Dies 59 deform the case and the upper turn of the coil 13 radially inwardly just far enough to provide an effective self-locking action with respect to screw 11. As an example, in a ¼-16 size nut, the coil may be deformed radially inwardly about 15 thousandths of an inch (in diameter), as represented by the broken lines 63' in FIG. 2. This compression of the nut in one diametrical direction causes slight expansion of the nut in a plane 64 at right angles to the direction of application of force by dies 59, to thus slightly flare out the corresponding flats 62 (typically about 15 thousandths of an inch in diameter) from the initial planar condition shown in broken lines at 62' in FIGS. 2 and 6 to the slightly curving full line condition of those figures, and to correspondingly slightly expand the upper turn 13' of coil 13 in that plane 64, as represented at 65 in FIG. 6. In effect, the uppermost turn and the engaged portion of the case are given a slightly oval or slightly elliptical shape. The bulge at 62 may be limited by engagement with a pair of rigid blocks 162 shaped and located to prevent bulging beyond a point at which a conventional hexagonal wrench can still fit over and actuate the nut. After the bulging at flats 62 is thus limited by engagement with blocks 162, the dies 59 may be pressed together slightly more, with resultant slight outward bulging of the nut case and coil at the locations designated 262 in FIG. 2 (between the locations of the dies 59 and blocks 162), and with the bulging at these locations also being kept small enough to avoid interference with proper engagement with a hexagonal wrench. No attempt has been made to show the bulging at locations 262 in the figures.

After the upper portion of the case and the contained upper turn of coil 13 have been deformed in this way to elliptical condition, the entire nut is heat treated at a temperature high enough to convert the metal of the case, coil and end plate to hardened condition, that is, condition H, without destroying the condition C of the coil. Thus, in spite of the welding and heat treating operations, the thread element 13 in the ultimate nut is, except at its welded periphery, in condition CH, that is, it is hardened by both cold working and heat treatment.

If the case and end plate are formed of martensitic 17-4PH stainless steel as previously discussed, and the coil is formed of initially semi-austenitic 17-7PH stainless steel, all of these parts, except for the welded periphery of the coil, will in the completed nut be in heat hardened martensitic condition.

In using the nut of FIG. 1, its lower portion is first screwed onto the externally threaded fastener 11, and can move onto that fastener freely until the upper end of screw 11 reaches the top turn 13 of the coil, at which time the screw thread just force turn 13' radially outwardly to a slightly expanded condition at the inwardly deformed locations in order to enable advancement of the screw entirely through the nut. The turn 13' cannot itself expand without simultaneously forcing the engaged portions of the case wall radially outwardly toward the broken line positions of FIG. 1. Thus, the resilience of both the outer case 12 and turn 13' of coil 13 provide together a very effective self-locking action with respect to the screw. As the inwardly deformed portions of the case and turn are forced radially outwardly, the outwardly bowed or expanded portions in plane 64 of FIG. 6 are pulled radially inwardly to also add to the self-locking effect. When the screw is removed from the nut, the resilience of the parts 12 and 13 returns their upper portions to the slightly deformed condition, so that the self-locking action will repeat reliably and consistently through many uses of the device. Further, the fact that the upper turn of the coil structure is not directly welded to the case enables that turn and the engaged portion of the case to function essentially as two separate but coacting springs in resisting the radially outward deflection, with those two springs having a greater combined flexibility than if they were welded together to in effect form a single spring of increased radial thickness. This will be apparent from the consideration of the basic spring formula:

$$d \propto L^3/t^3$$

where $d$ is the amount of deflection of a leaf spring or beam spring $L$ is the length of the spring, and $t$ is the thickness of the spring Since from this formula, the deflection of the spring is inversely proportional to the cube of the thickness for a given load, a much greater useful range of radial deflectibility of the coil and case is attained by leaving them unwelded at the self-locking location.

It is also noted that when the nut is in engagement with the screw, the radially abutting contact of the upper turn of coil 13 with case 12 enables that turn and the contacted portion of the case to take a substantial percentage of the axial load forces applied to the threads. In fact, since the upper turn of a nut is never required to take as great a load as the other turns, the upper turn in this device can take enough axial load to serve the full function normally required of a turn at that location, even though it is unwelded to the case. The overall axial length of the nut, and the number of turns required in the nut, can therefore be substantially less than in all conventional self-locking nuts now on the market.

The circularly abutting engagement of upper end surface 61' of the coil with shoulder 160 prevents extremity 60 of the coil from advancing in a counterclockwise direction in FIG. 2, and thus prevents the unwelded end turn from wrapping more tightly on the screw as the latter is advanced into the nut. Stated differently, this 'wraparound' effect is prevented by so retaining or confining the coil at opposite ends of the unwelded turn or portion as to prevent relative movement of those ends in a direction to circularly elongate the end turn and thus radially constrict it. One end of the unwelded turn is fixed by welding while the other is blocked against circularly elongating movement by shoulder 160. The locking action attained is thus accurately predeterminable by the elliptical deformation of the end turn and is not affected by any wraparound effect on the end turn.

It is contemplated that, if desired, the base plate 14 of the FIG. 1 device may be prewelded to case 12 before insertion of the coil 13 into the case and subsequent welding of the coil to the case. It is also contemplated that the case may be forged, machined or cast to a shape in which, as illustrated in the variational FIGS. 8 and 9 arrangement, the lower portion of the case 12a itself forms the helical ramp or shoulder surface 34a and shoulder 35a corresponding to surface 34 and shoulder 35 of FIG. 1, for engagement by the lowermost turn of coil structure 13a. In this way, end plate 14 of the FIG. 1 device may be eliminated. In either the FIG. 1 or FIG. 8 arrangement, however, it is highly desirable that the initial point of contact of the welding beam with the nut assembly be at a flat surface disposed directly transversely of the axis of the beam (e.g. surface 39 in FIG. 1) to avoid any tendency for lateral deflection of the beam such as would occur if the undersurface of element 14 in FIG. 1 were irregular, or if plate 14 were omitted and the beam was forced to strike the nut at the location of an abrupt shoulder formed at the juncture of the case and coil. Any such lateral deflection of the beam can adversely affect the extent to which some of the upper ones of the bottom four turns of the coil are welded in place, since slight lateral displacement of the upper end of the very narrow beam can cause it to miss completely the proper welding location between the coil and case.

The variational arrangement of FIGS. 8 and 9 is also illustrated as utilizing a different structure than that of FIGS. 1 to 7 for blocking circular movement of the upper extremity of coil 13a. Specifically, in FIGS. 8 and 9, the upper extremity of coil 13a is not turned outwardly in the manner of portion 60 of the first form of the invention, nor is there a notch or recess corresponding to notch 161 of FIG. 2, but instead the material of case 12a is upset slightly to form a radially inwardly projecting shoulder 113 which abuts against end surface 61'a of the coil to serve the function of shoulder 160 in FIG. 2. The shoulder 113 may be formed by striking downwardly against the upper surface of case 12a with an appropriately shaped upsetting tool at the location 112 of FIGS. 8 and 9. The inner surface 15a of case 12a has the same shape as corresponding surface 15 of FIGS. 1 to 7, except at the location of shoulder 113. The case and coil are deformed to the previously discussed oval shape at the location of the upper unwelded turn of the coil, to attain a self-locking action corresponding to that of the first form of the invention.

FIG. 10 is a view similar to FIG. 9 but showing still another arrangement in which the extremity 60b of coil 13b is restrained against circular movement relative to the case by welding that extremity directly to the case through a very short angle adjacent end surface 61b of the coil. The short weld between the radially outer surface of the extremity 60b of the coil and the inner surface 15b of the case is represented diagrammatically at 114 in FIG. 10, and may if desired be simply a spot weld, short arc weld, or the like. In any event, care is taken in making the weld 114 to avoid raising any portion of coil 13b other than its extremity 60b to a temperature high enough to destroy the previously discussed CH condition of the remainder of the coil. As in the other forms of the invention, the unwelded end turn of the coil is effectively restrained against circular elongation (in this case by welding at both ends of the turn) to avoid any tendency for attainment of a wraparound effect in the locking turn.

The form of nut shown in FIGS. 11 through 13 includes a coil 13c which may be constructed and installed the same as coil 13 of FIG. 1 except that the axially inner end of the coil in FIGS. 11 to 13 is ground off in a directly transverse plane 70 to form an annular shoulder 71 which is perpendicular to axis 16c of the nut, and bears against an annular directly transverse shoulder 72 formed in the inner portion of case 12c in lieu of the helical ramp shoulder 34 of FIG. 1. The coil 13c is electron beam welded into case 12c by the same type of essentially annular weld provided in the FIG. 1 arrangement, leaving the upper locking turn 13'c of the coil free of direct welded attachment to the case, and with this upper turn and the case being deformed to essentially oval configuration in the manner discussed in connection with FIG. 2. The self-locking action is thus the same as in the first form of the invention.

The outer case 12c of the FIGS. 11 to 13 form of the invention may also differ somewhat from the case 12 of FIG. 1, in that only the upper portion of the case is given an externally hexagonal configuration, by provision of flats 73 from the upper face of the nut to a location 74, downwardly beyond which the case has an externally cylindrical outer surface at 75, typically with a slightly increased diameter short washer-like outer surface 76 being provded at the bottom of the nut. This short cylindrical surface 76 may desirably have an axial or vertical extent corresponding substantially to the vertical height $h$ of an inner cylindrical surface 78 extending from bottom transverse end face 79 of the nut to the previously discussed upwardly facing annular coil engaging shoulder 72. The corners 80 of the upper hexagonal portion of the nut may be at a diameter corresponding to that of cylindrical surface 75 of the lower portion of the nut, with the flats 73 extending inwardly to diameters considerably smaller than that of surface 75, as seen clearly in FIG. 11. Thus, the upper portion of the nut allows for easy turning of the nut by a conventional wrench, while the lower portion of the nut case has a greater minimum radial thickness than the upper hexagonal portion, and thus has a much greater strength and resistance to expansion under load.

FIG. 14 shows the manner in which a number of the nuts of FIGS. 11 and 12 may be welded within an electron beam welding unit, in which there may be provided a horizontal plate 80 of highly heat conductive metal, such as aluminum, to function as a heat sink. This plate 80 may contain a large number of accurately dimensioned and located cylindrical upwardly facing recesses 81, dimensioned to closely receive and accurately locate the lower ends of as many mandrels 82 corresponding structurally to mandrel 45 of FIGS. 4 and 5. These mandrels are also highly heat conductive, typically being formed of copper, aluminum, or the like, and are inverted as illustrated in FIG. 14 to have their threaded ends 83 projecting upwardly, with coils 13c carried about these threaded ends and received within a number of the nut cases 12c. The coils may first be screwed onto their respective mandrels 82, and then inserted into cases 12c into tight engagement with end shoulders 72, after which the entire assemblies 82–12c–13c are inserted into plate 80 in the inverted positions of FIG. 14, with the plate then being placed within an electron beam welding unit in which the welding head 85 directs an electron beam 85 downwardly along a path corresponding to that illustrated at 57 in FIG. 1, to form the desired weld between the case and the radially outer portions of the coil, as well as between successive turns of the coil. During the welding of a particular one of the nuts in FIG. 14, the electron beam emitting head 85 is rotated about the axis of that nut to form the desired annular weld, or alternatively the nut and its mandrel may be turned relative to a non-rotating welding head. After the first nut has been welded, the head 84 automatically indexes to a position for welding the next successive nut in the same manner, etc., until all of the nuts have been welded. The heat of welding is conducted rapidly away from the radially inner portions of the coils through the mandrels 82 and plate 80, to thus prevent overheating of the radially inner portions of the coils, as has been discussed in connection with the other forms of the invention, to thereby maintain the work hardened condition of those inner portions of the coils in spite of the heating required at the peripheries of the coils for effecting the welding operations.

FIG. 15 is a view similar to FIG. 11, and shows another form of nut formed in accordance with the invention, which nut may be considered as identical with that of FIG. 11 except that the lower portion of case 12d does not project downwardly beyond the bottom transverse planar surface 71d of coil 13d, but rather is cut off in the same transverse plane 70d as is the coil. Thus the lower end of the coil is exposed at 71d for direct contact with the work, along with the aligned corresponding surface 171d of the case. The coil is welded into the case by axial electron beam welding from a welding head or gun 56d, which annularly welds the coil to the case from its lower end up to the top turn, with that upper turn being left free of direct welded attachment to the case, and being deformed to a self-locking configuration, along with a corresponding top portion of the case, as in FIG. 1.

In all of the above discussed forms of the invention, an additional advantage attained resides in the inherent capacity of the disclosed structures to automatically distribute axial loads evenly between the different threads of the nut. In conventional standard nuts, there is a tendency for the lowermost thread of the nut to take much more of the axial load in use than do the other turns, with the load on successive turns decreasing progressively to the top of the nut. In the present arrangements, however, the capacity of the individual turns of the coiled element to flex slightly (and resiliently) relative to one another in an axial direction enables the turns to automatically assume relative positions in which the axial loads on the different turns are balanced. The capacity for such relative flexure results from the fact that adjacent turns are welded to one another only at their radially outer extremities, (in the weld region designated 57 in FIG. 1), and inwardly of that location (desirably through at least about two-thirds of their radial extent, and for best results at least about three-fourths of that extent) are left free of direct bonded attachment to one another. Also, since the inner portion of each turn is in its very hard CH condition, as previously discussed, the various turns are capable of taking together a maximum amount of axial load even though slightly relatively deformable.

Some of the structural features and manufacturing processes described herein, such as the welding processes, may be utilized in non-locking nuts.

While certain specific embodiments of the present invention have been disclosed as typical, the invention is of course not limited to these particular forms, but rather is applicable broadly to all such variations as fall within the scope of the appended claims.

I claim:

1. The method of forming a composite nut that includes positioning within a case a separately formed helical coil structure which is formed of metal in work-hardened condition and has a radially inner portion shaped to form an internal thread and a radially outer portion with an outer surface proximate the case; directing a high energy beam generally axially along the inner surface of said case and along said outer surface of the coil structure in a relation forming a fusion bond between said case and said radially outer portion of said coil structure; locally heating said radially outer portion of the coil structure by said high energy beam, during formation of said fusion bond, to a temperature locally adversely affecting the work-hardened condition of said radially outer portion; maintaining said internal thread formed by said inner portion of the coil structure in threaded engagement with an external thread on a highly heat conductive heat sink mandrel during said heating; and conducting heat away from said inner portion of the coil structure through the engaged threads of said heat sink mandrel during said heating and at a rate maintaining said inner portion of the coil structure at a temperature substantially lower than said radially outer portion, and low enough to prevent destruction of its thread shaped configuration, and to prevent as great an adverse effect if any on the work-hardened condition of said inner portion as on said outer portion, and thereby maintain said inner portion and the thread formed thereby substantially harder than said outer portion.

2. The method as recited in claim 1, including fusion bonding radially outer portions of adjacent turns of said coil structure directly to one another by said localized heating but without heating of radially inner portions of adjacent turns to a temperature high enough to bond them together or destroy the work-hardened condition thereof.

3. The method as recited in claim 1, including removing said heat sink mandrel from threaded engagement with said internal thread formed by the inner portion of said coil structure after formation of said fusion bond.

4. The method as recited in claim 1, including relatively rotating said mandrel and coil structure in a relation screwing said heat sink mandrel into engagement with said internal thread formed by said coil structure prior to formation of said fusion bond, and screwing said mandrel out of threaded engagement with said internal thread after formation of the fusion bond.

5. The method as recited in claim 1, in which said high energy beam is an electron welding beam directed axially along the periphery of said coil structure and along said inner surface of said case while relatively rotating said beam and said case and coil structure to form an essentially annular fusion bond between the case and coil structure.

6. The method as recited in claim 1, in which said high energy beam is an electron welding beam directed axially along the periphery of said coil structure and along said inner surface of said case while relatively rotating said beam and said case and coil structure to form an essentially annular fusion bond between the case and coil structure, said method including maintaining said beam wide enough in a direction radially of the case and coil structure to fuse the metal of the coil structure a short distance radially inwardly from said inner surface of the case and thereby weld the radially outer portions but not radially inner portions of successive turns of the coil structure directly to one another, while conducting heat away through said heat sink mandrel rapidly enough to avoid heating of the radially inner portion of the coil structure to a temperature high enough to destroy its work-hardened condition.

7. The method as recited in claim 6, including heat treating of the entire case and coil structure after formation of said fusion bond and at a temperature high enough to further harden the metal of the coil structure but not high enough to destroy said work-hardened condition of the radially inner portion of the coil structure.

8. The method as recited in claim 1, including heat treating the entire case and coil structure after formation of said fusion bond and at a temperature high enough to further harden the metal of the coil structure but not high enough to destroy said work-hardened condition of the radially inner portion of the coil structure.

9. The method as recited in claim 1, including shaping a portion of said coil structure to a deformed condition in which it is engageable in self-locking relation with a coacting screw connected into the nut.

10. The method as recited in claim 1, including shaping a portion of said coil structure to a deformed condition in which it is engageable in self-locking relation with a coacting screw conneccted into the nut, and controlling said high energy beam to leave essentially unbonded direcctly to the radially adjacent portion of the case at least part of said portion of the coil structure which is deformed to self-locking condition.

11. The method as recited in claim 1, including shaping a portion of said coil structure to a deformed condition in which it is engageable in self-locking relation with a coacting screw connected into the nut, controlling said high energy beam to leave essentially unbonded directly to the radially adjacent portion of the case at least part of said portion of the coil structure which is deformed to self-locking condition, and fixing said unbonded part of the coil structure at its opposite ends against relative movement of said ends circularly in a direction to circularly elongate and thus radially constrict the locking portion.

12. The method as recited in claim 1, including shaping a portion of said coil structure to a deformed condition in which it is engageable in self-locking relation with a coacting screw connected into the nut, controlling said high energy beam to leave essentially unbonded directly to the radially adjacent portion of the case at least part of said portion of the coil structure which is deformed to self-locking condition, with said fusion bond fixing one end of said unbonded part of the coil structure to the case, said method including fixing the opposite end of said unbonded part of the coil structure against movement circularly relative to the case in a direction to circularly elongate and thus radially constrict said unbonded part.

13. The method as recited in claim 1, including shaping a portion of said coil structure to a deformed condition in which it is engageable in self-locking relation with a coating screw connected into the nut, controlling said high energy beam to leave essentially unbonded directly to the radially adjacent portion of the case at least part of said portion of the coil structure which is deformed to self-locking condition, with said fusion bond fixing one end of said unbonded part of the coil structure to the case, said method including providing a shoulder on said case engageable with a shoulder on said coil structure acting to fix the second end of said unbonded part of the coil structure against movement circularly relative to the case and relative to said bonded first end in a direction to circularly elongate said unbonded part and thus radially constrict it.

14. The method as recited in claim 1, including shaping a portion of said coil structure to a deformed condition in which it is engageable in self-locking relation with a coating screw connected into the nut, controlling said high energy beam to leave essentially unbonded directly to the radially adjacent portion of the case at least part of said portion of the coil structure which is deformed to self-locking condition, with said fusion bond fixing one end of said unbonded part of the coil structure to the case, said method including bonding said coil structure to the case at the opposite end of said unbonded part of the coil structure to fix said unbonded part against circular elongation.

15. The method as recited in claim 1, including providing at an end of said case a shoulder which is received axially opposite an end of the coil structure, and directing said high energy beam essentially axially through said shoulder and then along the periphery of said coil structure.

16. The method as recited in claim 1, including aiming said high energy beam essentially axially along the periphery of said coil structure and along a path such that the beam in first entering the material of said nut first strikes a surface which is essentially smooth and disposed essentially transversely of the axis of said coil structure.

* * * * *